(No Model.) 7 Sheets—Sheet 1.

H. T. DAWSON.
GAS ENGINE.

No. 530,508. Patented Dec. 11, 1894.

(No Model.)

H. T. DAWSON.
GAS ENGINE.

No. 530,508.

7 Sheets—Sheet 2

Patented Dec. 11, 1894.

Witnesses.
Baltus DeLong.
Chas. F. Seurmer.

Inventor.
Henry Thomas Dawson
By his Atty's.
Baldwin, Davidson & Wight.

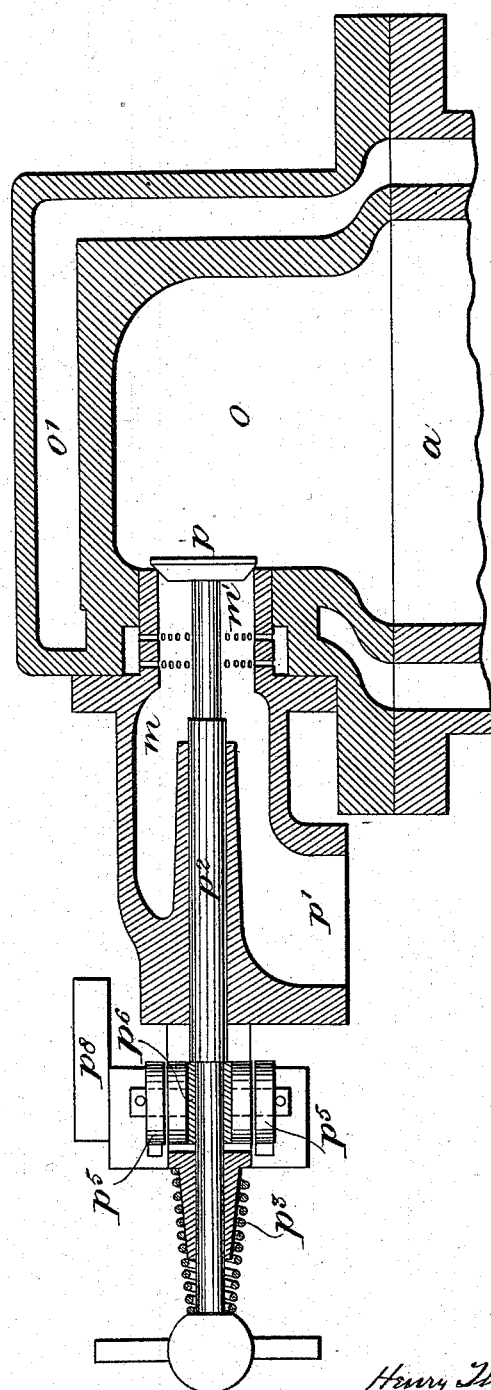

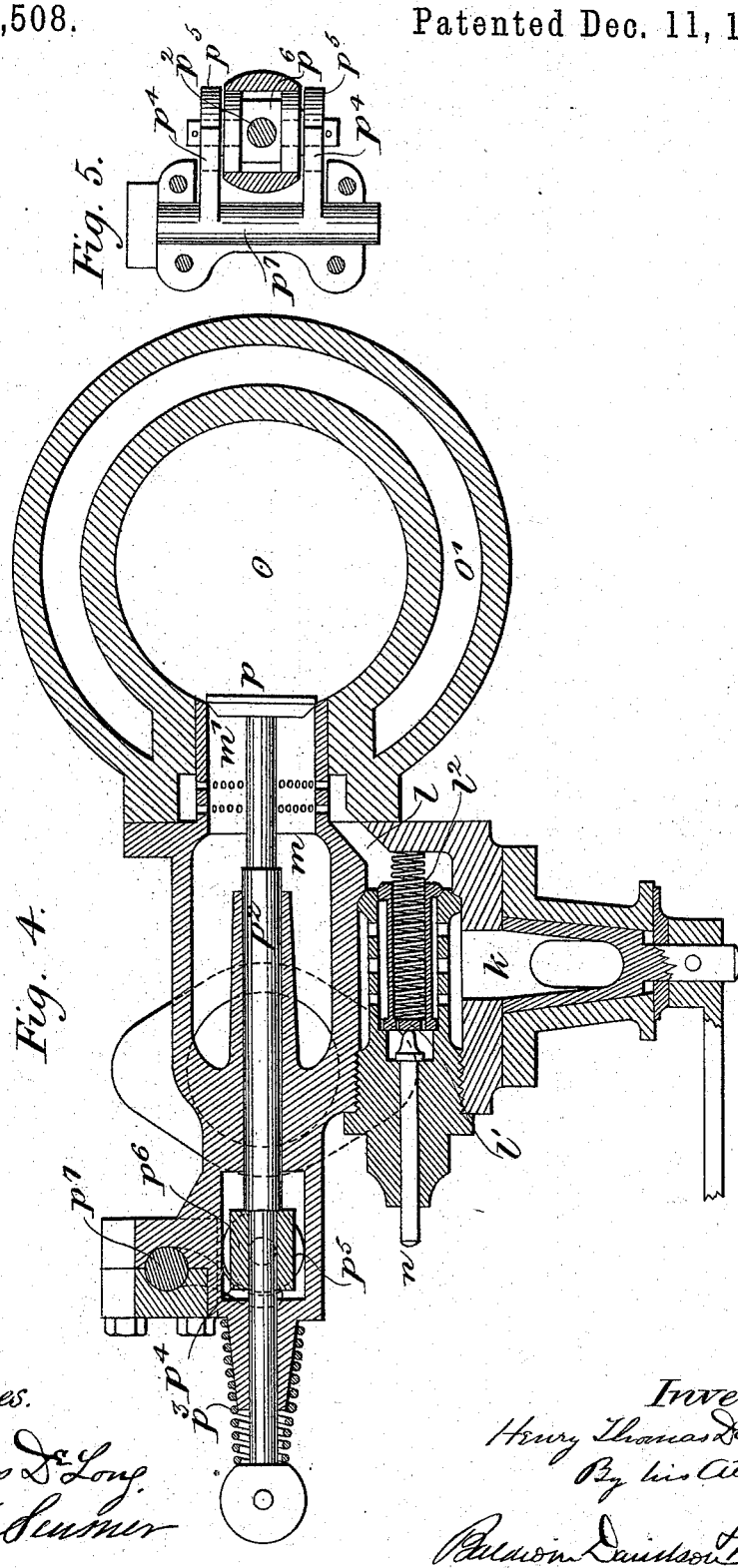

(No Model.) 7 Sheets—Sheet 5.

H. T. DAWSON.
GAS ENGINE.

No. 530,508. Patented Dec. 11, 1894.

Witnesses.

Inventor.
Henry Thomas Dawson,
By his Att'ys.

(No Model.)

H. T. DAWSON.
GAS ENGINE.

No. 530,508. Patented Dec. 11, 1894.

Witnesses.
Baltus D. Long.
Chas. F. Sensner.

Inventor:
Henry Thomas Dawson
By his Atty's
Baldwin Davidson & Wight (No Model.) 7 Sheets—Sheet 7.
H. T. DAWSON.
GAS ENGINE.
No. 530,508. Patented Dec. 11, 1894.
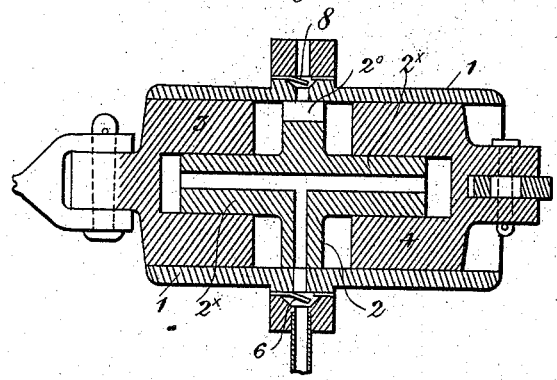
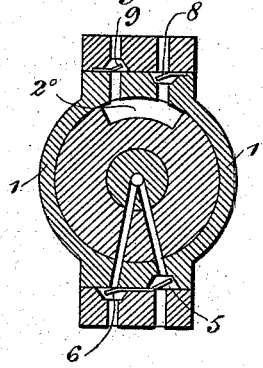
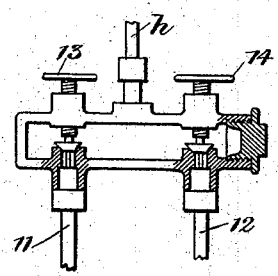
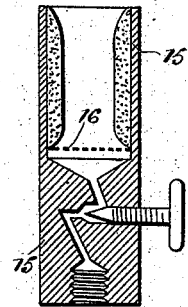
Witnesses.
Inventor.
Henry Thomas Dawson,
By his Atty's.

UNITED STATES PATENT OFFICE.

HENRY THOMAS DAWSON, OF SALCOMBE, ENGLAND.

GAS-ENGINE.

SPECIFICATION forming part of Letters Patent No. 530,508, dated December 11, 1894.

Application filed May 2, 1893. Serial No. 472,770. (No model.) Patented in England April 11, 1892, No. 6,952, and April 11, 1893, No. 7,426; in France April 8, 1893, No. 229,212; in Belgium April 10, 1893, No. 104,225; in Germany April 18, 1893, No. 73,561 and No. 75,328; in Switzerland April 24, 1893, No. 6,703; in Victoria May 5, 1893, No. 10,506; in New South Wales May 8, 1893, No. 4,398; in New Zealand May 15, 1893, No. 6,187; in Spain June 26, 1893, No. 14,541; in Italy June 30, 1893, LXVI, 346; in Austria-Hungary January 23, 1894, No. 44 and No. 973, and in Canada May 25, 1894, No. 46,157.

*To all whom it may concern:*

Be it known that I, HENRY THOMAS DAWSON, gentleman, a subject of the Queen of Great Britain, residing at Salcombe, in the county of Devon, England, have invented certain new and useful Improvements in Gas-Engines, of which the following is a specification, and for which I have received Letters Patent in the following foreign countries: Great Britain, No. 6,952, dated April 11, 1892, and No. 7,426, dated April 11, 1893; France, No. 229,212, dated April 8, 1893; Belgium, No. 104,225, dated April 10, 1893; Germany, No. 73,561, dated April 18, 1893, and No. 75,328, dated April 18, 1893; Switzerland, No. 6,703, dated April 24, 1893; Austria, No. 44\973, dated January 23, 1894; Italy, No. 66\346, dated June 30, 1893; Spain, No. 14,541, dated June 26, 1893; Canada, No. 46,157, dated May 25, 1894; New Zealand, No. 6,187, dated May 15, 1893; New South Wales, No. 4,398, dated May 8, 1893, and Victoria, No. 10,506, dated May 5, 1893.

This invention has for its object improvements in gas engines, which improvements are illustrated by the drawings annexed and the novel features are defined by the claiming clauses with which the specification terminates.

Figure 1:
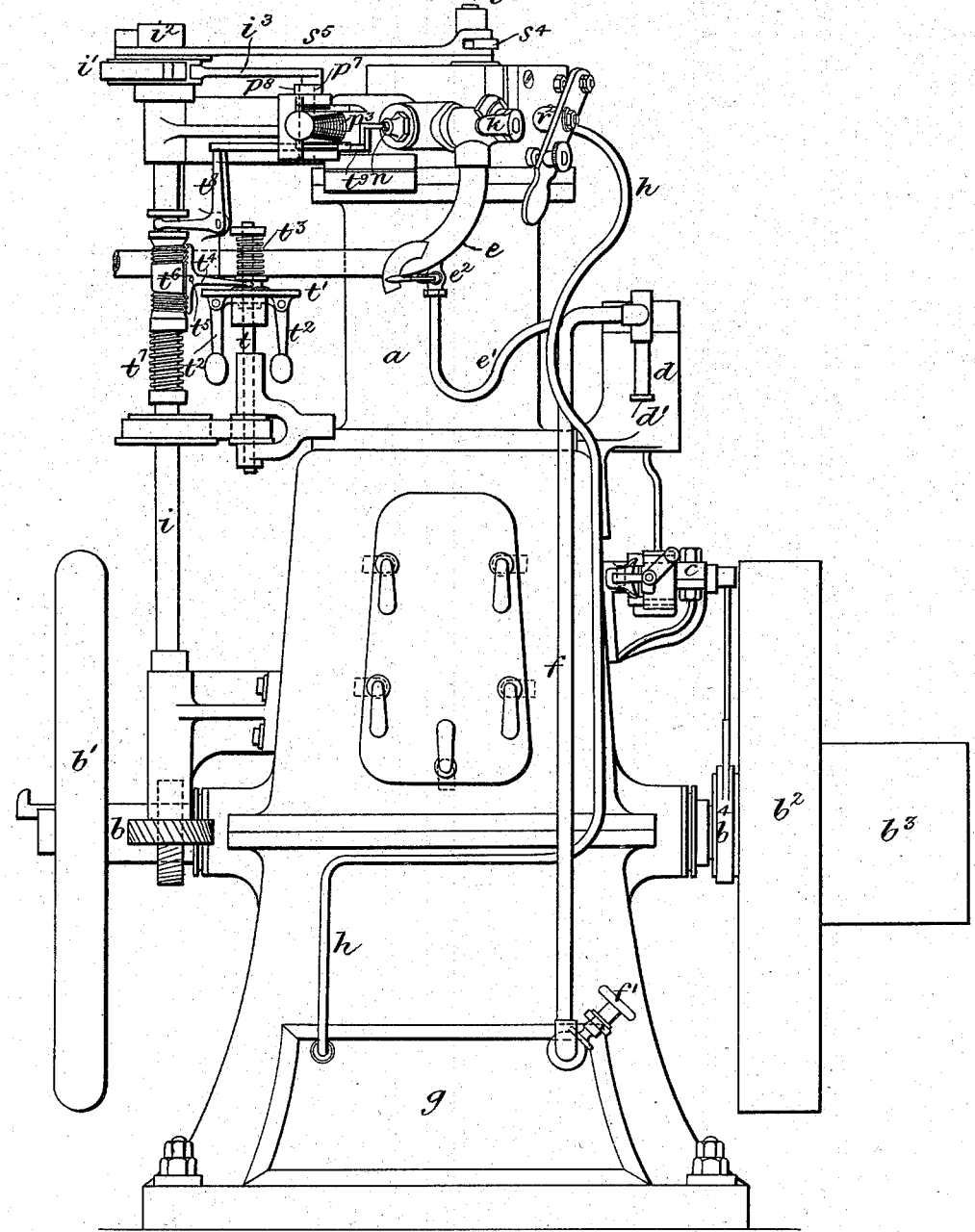
Figure 2:
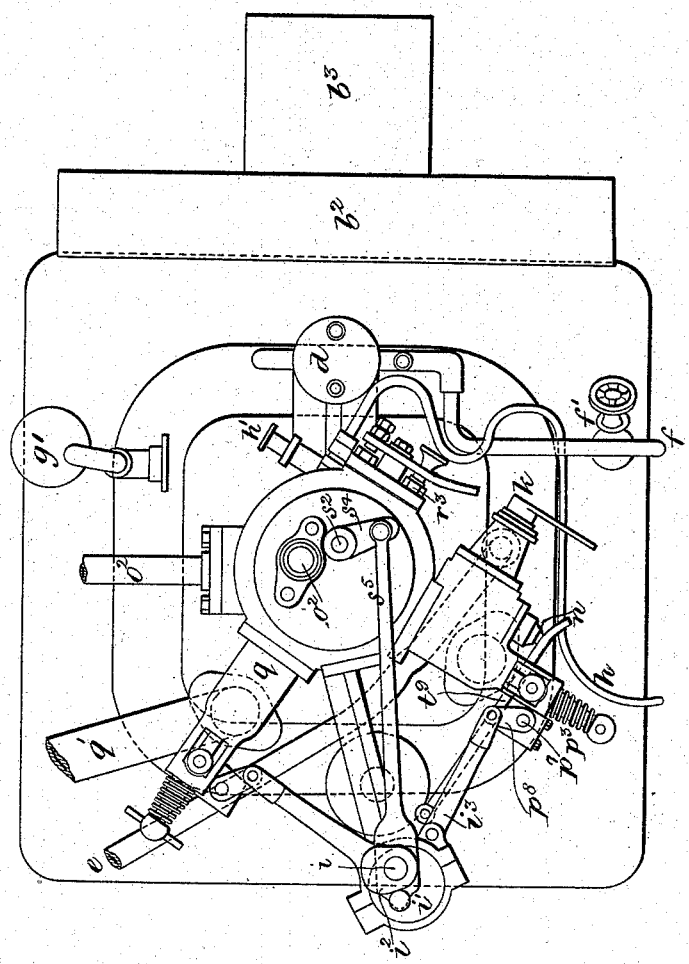
Figure 6:
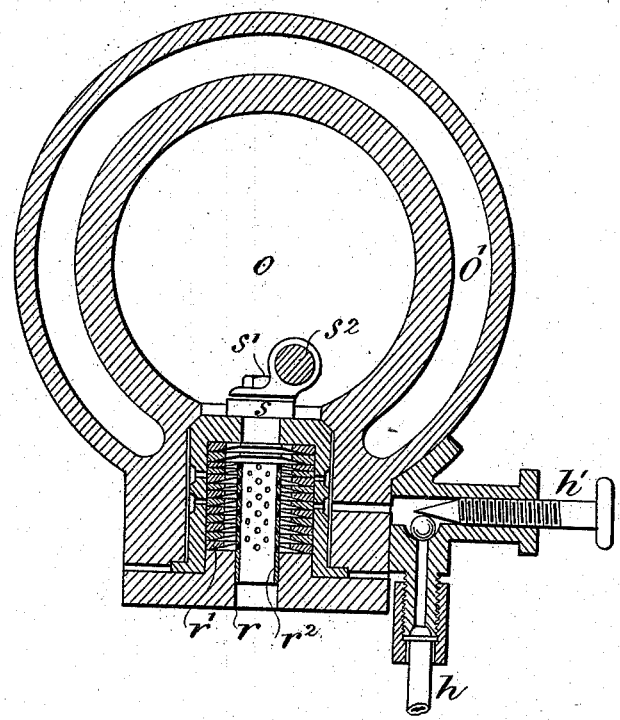
Figure 8:
Figure 7:
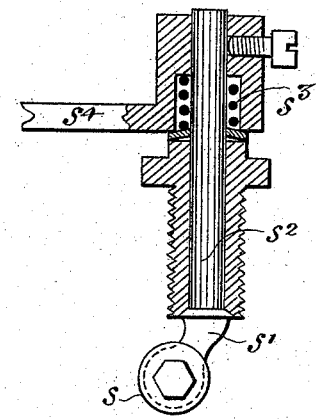
Figure 10:
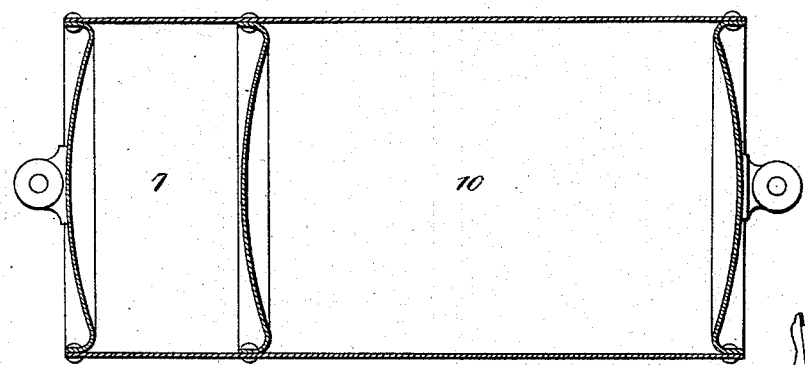
Figure 9:
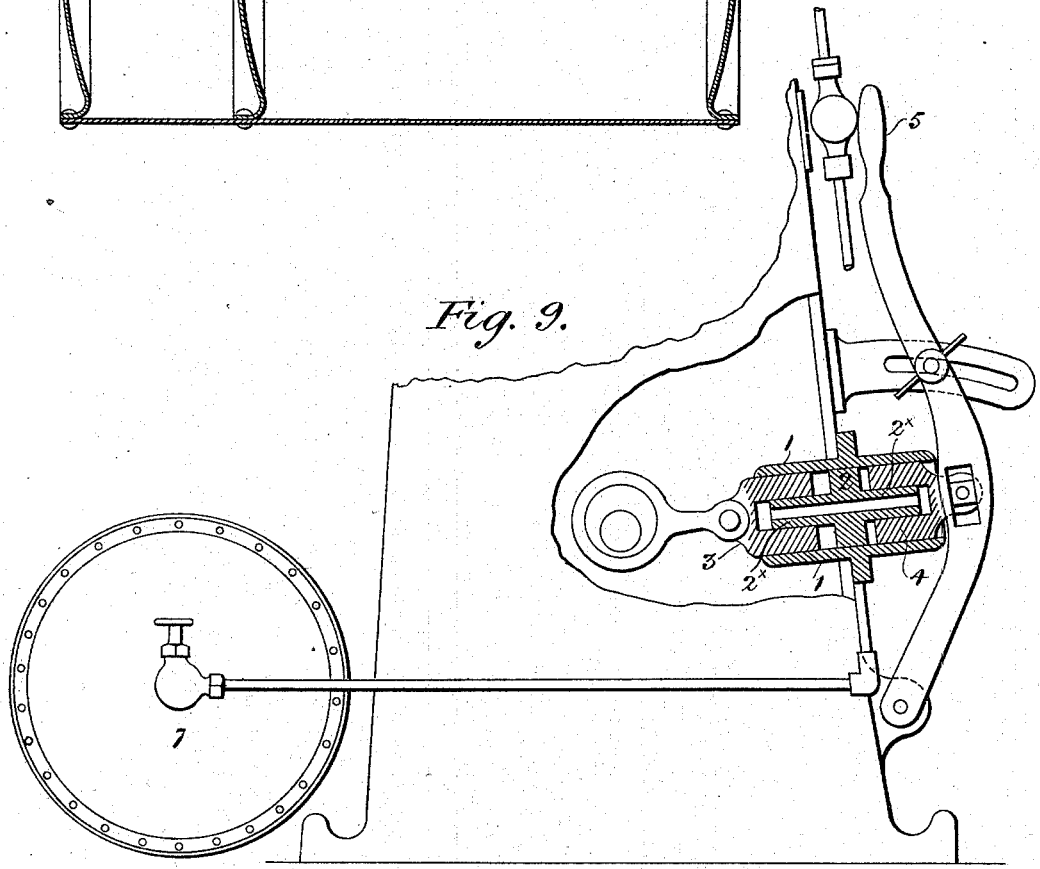

Figure 1 is an elevation and Fig. 2 is a plan of the engine. Fig. 3 is a vertical section and Fig. 4 is a horizontal section of the valve and parts in connection therewith for admitting gas and air into the combustion chamber of the engine. Fig. 5 is an elevation partly in section of some of the parts shown in Fig. 4. Fig. 6 is a horizontal section of the combustion chamber and ignition apparatus. Fig. 7 is an elevation partly in section of the ignition valve and parts in connection therewith. Fig. 8 shows a part of the ignition apparatus. Fig. 9 shows an elevation partly in section of the pump for compressing gas and air into store reservoirs also of the reservoirs and mixing chamber. Fig. 10 is a horizontal section of the reservoirs. Fig. 11 is a longitudinal section of the pump to a larger scale. Fig. 12 is a transverse section of the pump. Fig. 13 is a section of the mixing chamber. Fig. 14 is a vertical section of a testing burner.

$a$ is the cylinder of the engine. In it a piston works reciprocating but not rotating and this piston by a connecting rod drives a crank upon the shaft $b$.

$b'$ $b^2$ $b^3$ are fly wheels and belt pulley upon the crank shaft. The crank is inclosed in a chamber containing oil or oil and water into which the crank dips.

$b^4$ is an eccentric upon the shaft which gives motion to a piston in an air pump cylinder $d$. The air pump compresses air and gas for the supply of the ignition apparatus. It takes in air at the inlet $d'$ and it also sucks in a small quantity of gas which is supplied by a pipe $e'$ connected with the gas main $e$.

$e^2$ is a regulating cock with an indicator.

The mixed gas and air is forced by the air pump down the pipe $f$, past the stop cock $f'$ into the chamber $g$ in the base of the engine where it is stored under pressure.

$g'$ is a ventilating pipe and catch box in connection with the crank chamber.

$h$ is a pipe leading the mixed gas and air to the ignition apparatus.

$i$ is a vertical shaft which I call the "cycle" shaft. It is geared with the crank shaft at its lower end, and rotates once for each cycle of the engine. It has at its upper end an eccentric $i'$ and a cam $i^2$.

The eccentric $i'$ controls the admission of gas and air to the cylinder and the exit of the products of combustion. The cam $i^2$ controls the ignition valve.

The gas for the supply of the engine passes from the main $e$ by the stop cock $k$ into the valve chamber $l$ and thence into the chamber $m$ of the admission valve.

$l'$ is a double beat valve in the chamber.

The valve $l'$ is pressed to its seats by the spring $l^2$ but it is opened more or less when the engine is running, being displaced by the rod $n$ which is under the control of the governor and the rollers $p^5$ on the main valve stem. The end of the rod $n$ is inclined or it might be cut in steps.

$o$ is the combustion chamber on the outer end of the cylinder $a$. Both it and the cylinder are kept cool by a water jacket $o'$.

$o^2 o^2$ are pipes in connection with the water jacket.

The combustion chamber $o$ has an aperture in its side into which a nozzle projecting from the valve chamber $m$ is fitted.

The gas after passing the valve $l'$ enters by the perforations $m'$ into the valve chamber $m$ and from thence when at suitable times the main inlet valve $p$ is opened, it passes into the combustion chamber. When the valve $p$ opens the pressure in the combustion chamber $o$ is below atmospheric pressure and the indraft then causes gas to enter the combustion chamber together with air which is drawn in at the inlet $p'$. The valve $p$ is on a stem $p^2$ and a coiled spring $p^3$ holds the valve to its seat at the inner end of the nozzle of the valve chamber $m$. In order to open the valve $p$ at the proper times the fingers $p^4$ are provided. They press against the rollers $p^5$ mounted on a block $p^6$ through which the stem $p^2$ passes. There is a shoulder on the stem against which the block presses and this causes the opening of the valve. The spindle $p^2$ is free to turn in the block $p^6$ and cross handles are provided for turning the valves. The fingers $p^4$ are on an axis $p^7$ and an arm $p^8$ on the axis is connected by the eccentric rod $i^3$ with the eccentric $i'$.

It will be observed in respect to the fingers $p^4$ and the rollers $p^5$ that the fingers are so formed that when the valve is closed, as is represented in the figure, that it is the part of the finger near to the axis which bears upon the roller but as the valve is progressively opened parts of the finger more and more remote from its axis come into contact with the bowl and the opening of the valve is consequently accelerated. Thus the opening of the valves is rendered sufficiently prompt.

The stem of the outlet valve passes through a valve chamber $q$. It is similar to the inlet valve $p$ and is opened by the same eccentric but at a different time. The gases after leaving the combustion chamber and the valve chamber $q$ are led away by a pipe $q'$.

There is an aperture and socket formed in the side of the combustion chamber $o$ to receive the ignition apparatus, which consists of a holder $r$ containing fire clay disks $r'$ packed close one against the other sometimes also a perforated tube of refractory material $r^2$. One of these disks is shown separately at Fig. 8. Gas and air pass from the pipe $h$ past the stop valve $h'$ into annular grooves formed around the holder $r$ and perforations opening from the grooves lead into the central cavity of the holder $r$, among the disks $r'$. The gas and air is burned in contact with the disks $r'$ and tube $r^2$ which consequently become highly heated. There are openings at the ends of the holder $r$. That at the outer end is usually kept closed by a door $r^3$ which is opened only for lighting and while the disks are warming. The aperture at the other end of the holder $r$ is opened and closed during the working of the engine, the ignition valve $s$ being seated upon it. The valve $s$ is loosely jointed to an arm $s'$ on the lower end of a spindle $s^2$. This spindle turns in a bearing which is screwed into the combustion chamber and a coiled spring $s^3$ presses the spindle outward and holds a valvular enlargement upon it against the lower end of the bearing and so makes a gas tight joint. An arm $s^4$ is fixed on to the spindle and this is jointed to a rod $s^5$ which receives movement from the cam $i^2$. The rod $s^5$ has a bowl upon it which is held against the cam by a spring not shown in the drawings. The valve $s$ opens at a time when the gaseous charge in the combustion chamber is compressed so that a portion of the charge immediately enters the tube $r^2$ among the disks $r'$ and ignition ensues; the valve closing before the next charge is admitted.

The shaft $i$ by means of pulleys and a belt or otherwise drives a governor consisting of an axis $t$ carrying a disk $t'$ which revolves with the axis $t$ and can move along it. The weighted levers $t^2$ are jointed to the disk and as the weights diverge by the centrifugal action, the shorter arms of the levers press upon a collar upon the axis and the disk $t'$ is thereby raised compressing the spring $t^3$ and moving the T-form lever $t^4$ about its fulcrum at $t^5$. Upon the head of the lever $t^4$ are teeth which when the lever is in mid position stand clear of the sleeve $t^6$ which is able to slide upon the shaft $i$ but at other times the teeth engage with one or other of the screw threads or worms which the sleeve has upon it. The worms are right and left handed and according as one or other is engaged the sleeve as it rotates slides to or fro. The weight of the sleeve if vertical is supported by a spring $t^7$. An angle lever $t^8$ transmits the endwise movement of the sleeve to a bar $t^9$ which is tapered or inclined at the end. The rollers on valve spindle $p^2$ press upon the bar $t^9$ when the valve $p$ opens, and when the engine is running too slowly $t^9$ bears against the end of the rod $n$, and unseats the valve $l$. As the speed of the engine increases the bar $t^9$ is withdrawn, and the valve $l$ opens less or not at all.

I will now describe Figs. 9 to 14 inclusive. In Fig. 13, $h$, is a pipe which supplies to the furnace cell of the ignition apparatus a suitable mixture of gas and air from the mixing chamber shown by Fig. 13. The pump which supplies the gas and air under pressure consists of a cylinder 1 within which there is fixed a partition 2 carrying two rams $2^\times 2^\times$. There are also two plungers 3, 4. The plunger 3 receives a reciprocating movement from an eccentric upon the crank shaft of the engine. A similar movement can be imparted to the plunger 4 by means of the hand lever 5. The hand lever is worked only to get up pressure before first starting the engine. At other times it is locked fast. The plungers 3, 4 have cylindrical cavities in them and corresponding rams $2^\times 2^\times$ on the partition 2 project into the cavities in the plungers. There are passages bored through the rams $2^\times$ $2^\times$ and branch passages leading to valves 5, 6. When the plunger 3 or 4 moves outward or away from the central partition 2 a partial vacuum is formed and gas enters the central space from the gas main by the valve 5. When on the other hand the plunger moves inward toward the partition the gas is compressed and passes out by the valve 6 into the reservoir 7. The annular space within the cylinder 1 and around the rams $2^\times$ $2^\times$ is connected with inlet and outlet valves 8, 9 and communication from one side of the partition to the other is established by a passage $2^\circ$. The movement of the plunger causes air to enter the cylinder by the valve 8 and to be delivered by the valve 9 whence it passes into the reservoir 10. The pressure which the pump is able to generate depends on the relative dimensions of the clearance spaces and plungers and this can be varied at will by moving the handle 5 and clamping it in another position. The apparatus is preferably so arranged that the reservoirs 7 and 10 can be charged each to about one atmosphere pressure and this pressure be maintained uniformly while the engine is at work. 11 is the pipe by which gas enters the mixing chamber from the reservoir 7 and 12 is the pipe by which air enters the mixing chamber from the reservoir 10. Valves 13, 14 which can be adjusted by hand control the supply to the mixing chamber. $h$ is the pipe which leads the mixed gas and air to the ignition apparatus. I connect with the mixing chamber the testing burner shown by Fig. 14. It consists of a metal cylinder 15 with a valve at the lower part by which the gaseous mixture is allowed to enter. It passes upward through a diaphragm 16 of wire gauze into the upper part of the cylinder which is lined with fire clay or other refractory material. If the gas burns with a low flame and the refractory lining becomes highly heated the mixture is suitable. If not it can be easily regulated by the hand valves 13, 14.

What I claim is—

1. In a gas engine the combination of a combustion chamber $o$, a furnace chamber $r$ containing refractory material, means for supplying gas to such furnace chamber and burning it among the refractory material within said furnace chamber and an ignition valve $s$ between the combustion chamber and the holder such valve opening inwardly into the furnace chamber and permitting a portion of the charge to penetrate among the highly heated refractory material.

2. In a gas engine, the combination with the combustion chamber, of the valve $p$, its stem $p^2$, the valve chamber $m$, a spring $p^3$, for closing the valve, the collar $p^6$ on the valve stem, the rollers $p^5$, mounted on the collar, the fingers $p^4$, in contact with the rollers and means for operating the fingers to thrust the valve open.

3. In a gas engine, the combination of a combustion chamber, forming part of the working cylinder, inlet, outlet and ignition valves in connection with the combustion chamber, a cam on a shaft parallel to the cylinder, and rotating in time with the engine cycle, connections between said cam and the ignition valve and a single eccentric upon the cam or cycle shaft connected with the inlet and outlet valves to operate them.

4. An ignition apparatus for a gas engine, comprising a holder $r$, disks of fire clay $r'$, or other suitable pieces of refractory material, devices for admitting to the midst of the disks or pieces a mixture of gas and air, which, being burned, heats the disks or pieces, and connections between the combustion chamber of the engine and the heated disks, and a valve for permitting a portion of the charge to pass to the heated surfaces.

5. An ignition apparatus for a gas engine comprising a furnace cell heated by the combustion of gas and air within it and a valve admitting into the furnace cell a portion of the charge to be ignited, in combination with a pump, separate reservoirs into which gas and air are forced by the pump in suitable proportions, and a mixing chamber into which the gas and air are forced, and which is connected with the furnace cell.

6. The combination with the mixing chamber of a test burner, comprising a metal cylinder provided with a passage for gas and air, a valve for regulating said passage, a reticulated diaphragm above the passage, and a lining of refractory material in the upper part of the cylinder.

7. The combination, with the combustion chamber of a gas-engine, of igniting apparatus connected therewith, gas and air reservoirs connected with the igniting apparatus and supplying mingled gas and air thereto, and a compound pump, comprising a casing connected to the reservoirs by suitable passages provided with suitable valves, and having a partition 2, carrying rams $2^\times$, and provided with channels, as described, the pistons 3 and 4 and means for operating them.

8. The combination, with the combustion chamber of a gas-engine, of igniting apparatus connected therewith, gas and air reservoirs, a mixing chamber connected with the ignition apparatus and with the gas and air reservoirs, and a pump for supplying gas and air to the reservoirs, comprising a casing, 1, a partition 2, provided with channels, as described, and one or more pistons, air inlet and outlet valves, gas inlet and outlet valves, and means for operating the pistons.

HENRY THOMAS DAWSON.

Witnesses:
 T. C. CARPENTER,
24 *Southampton Bgs., Chancery Lane.*
 T. F. BARNES,
17 *Gracechurch Street, London, E. C.*